United States Patent [19]

Tatem et al.

[11] 4,172,431
[45] Oct. 30, 1979

[54] INDUSTRIAL BOILERS

[75] Inventors: John A. Tatem, Wolverhampton; Reginald D. Northcote, Lower Penn, both of England; Frederick G. McMullen, Gwynedd Valley, Pa.

[73] Assignee: Parkinson Cowan GWB Limited

[21] Appl. No.: 824,631

[22] Filed: Aug. 15, 1977

[51] Int. Cl.² ............................ F23B 1/14; F22B 7/12
[52] U.S. Cl. .................................... 122/5; 122/149; 110/229
[58] Field of Search ............... 122/5, 2, 149; 110/224, 110/228, 229

[56] References Cited

U.S. PATENT DOCUMENTS

| 1,758,630 | 5/1930 | Trent | 122/5 |
| 3,471,369 | 10/1969 | Cox et al. | 122/2 |
| 3,756,201 | 9/1973 | Williams | 110/234 |
| 3,769,921 | 11/1973 | McMullen | 110/224 |
| 3,978,821 | 9/1976 | Schreiber | 122/5 |

Primary Examiner—Kenneth W. Sprague
Attorney, Agent, or Firm—Merriam, Marshall & Bicknell

[57] ABSTRACT

An industrial boiler comprising a combustion chamber having a furnace therein, means for feeding products of combustion from the combustion chamber to a heat exchanger to heat water/stream therein, a pyrolytic retort, means to feed said products of combustion into heat transfer relationship with the retort to pyrolize material therein and means to feed products of pyrolysis from the retort.

8 Claims, 3 Drawing Figures

INDUSTRIAL BOILERS

BACKGROUND OF THE INVENTION

2. Field of the Invention

This invention relates to an industrial boiler.

SUMMARY OF THE INVENTION

An object of the invention is to provide a new and improved industrial boiler.

According to one aspect of the present invention we provide an industrial boiler comprising, a combustion chamber having a furnace therein, means for feeding products of combustion from the combustion chamber to a heat exchanger to heat water/steam therein, a pyrolitic retort, means to feed said products of combustion into heat transfer relationship with the retort to pyrolose material therein and means to feed products of pyrolysis from the retort.

Preferably means are provided to feed products of pyrolysis from the retort to the combustion chamber to fire the furnace therein.

The products of pyrolysis which are fed to the combustion chamber may be in the solid, liquid or gaseous state.

According to another aspect of the present invention we provide an industrial boiler comprising an outer continuous shell within which is contained the steam and/or waterspace of the boiler, a combustion chamber including a furnace, a plurality of smoke tubes for passage therethrough of the products of combustion of the furnace, apparatus for feeding solid fuel to the the furnace gate downwardly through the steam and/or water space of the boiler, a burner to feed fluid fuel to the furnace, a pyrolytic retort, means to feed said products of combustion into heat transfer relationship with the retort to pyrolise material in the retort and means to feed products of pyrolysis from the retort.

Preferably means are provided to feed products of pyrolysis from the retort to said solid fuel feed apparatus and/or said burner for fluid fuel.

The pyrolytic retort may be located in the path of the products of combustion between the combustion chamber and the smoke tubes.

Steam produced by the boiler may be fed to an electric generator, for example a turbine generator and preferably mounted on the boiler and exhaust steam from the generator may be fed to a drying apparatus to predry material to be fed to the pyrolytic retort. The electricity produced by the generator can be used to power the electrically operated services of the boiler such as the means for feeding waste material to and through the pyrolytic retort and, for example, it may be used to drive a hogging machine operative to reduce the size of the waste material prior to entry into the pyrolytic retort. The power can also be used for other purposes in the premises or plant in which the boiler is provided.

As the generator can be provided as part of the "package" supplied by the boiler manufacturer, and is preferably mounted on the boiler itself, a customer is provided with a complete operative assembly.

The material to be fed to the pyrolytic retort may comprise waste material, such as domestic refuse, sewage sludge and the like.

Waste material can consist of many different components. It is not convenient to use such waste products directly as fuel in an industrial boiler because of the different characteristics of the fuels. Whilst a boiler can be set up for one particular waste material it is not possible to use the boiler as thus set up for all waste materials and indeed, it is not always possible to obtain a particular waste material having consistent properties.

However, a wide range of waste materials when pyrolysed produce similar products of pyrolysis. Generally most waste materials give rise to a large volume of combustible gas comprising recoverable and marketable constituent gases such as $CO$, $CO_2$, $H_2$ and $CH_4$, light and heavy oils, which can be used as liquid fuel, and there remains the charred residue or "char fines" of the waste material which can be used as a solid fuel, or for other petrochemical purposes or as a filter media.

These products of pyrolysis are produced consistently irrespective of the characteristics of the waste material and thus provide a convenient fuel for firing an industrial boiler.

By incorporating a pyrolytic retort in an industrial boiler the products of pyrolysis can be fed directly, or indirectly, to the boiler to fire the boiler and the products of combustion are utilised to heat the pyrolytic retort to pyrolise new waste material to provide future fuel for the boiler.

It is preferred that means are provided for conveniently removing the pyrolytic retort or a part thereof from the boiler either for maintenance of the retort or to permit changing of the retort to shorten maintenance intervals or so as to permit convenient introduction into the furnace of the most suitable pyrolytic retort for the waste material to be utilised.

The pyrolytic retort may be arranged to be lifted vertically from the boiler or may be arranged in a transfer mechanism for movement vertically, or, horozontally transversely, of the boiler whereby one pyrolytic retort or part may be removed from the boiler and a second pyrolytic retort or part simultaneously introduced into the boiler.

The output from the pyrolytic retort may be fed to a recovery system wherein the products are seperated to permit of recovery of desired components, for example, tar, light and heavy oils, ammonia and methane. In addition the char fines are recovered from the pyrolytic retort. The char fines, methane and appropriate oils may be used to fire the boiler as described hereinbefore. If desired, one or a combination of these fuels may be used. The materials recovered from the pyrolytic retort which are not used to fire the boiler may be sold. The charred residue may be treated, for example, with high temperature steam, to produce carbon monoxide and hydrogen combinations.

The charred or carbonised residue of pyrolysis can be used for filtration of effluent from sewage treatment plants before discharge and may be regenerated by passing through the pyroliser again. Alternatively the charred residue may be activated by using superheated steam.

BRIEF DESCRIPTION OF THE DRAWINGS

Two embodiments of the invention will now be described in more detail by way of example with reference to the accompanying drawings wherein.

DESCRIPTION OF THE PREFERRED EMBODIMENTS

Figure 1:
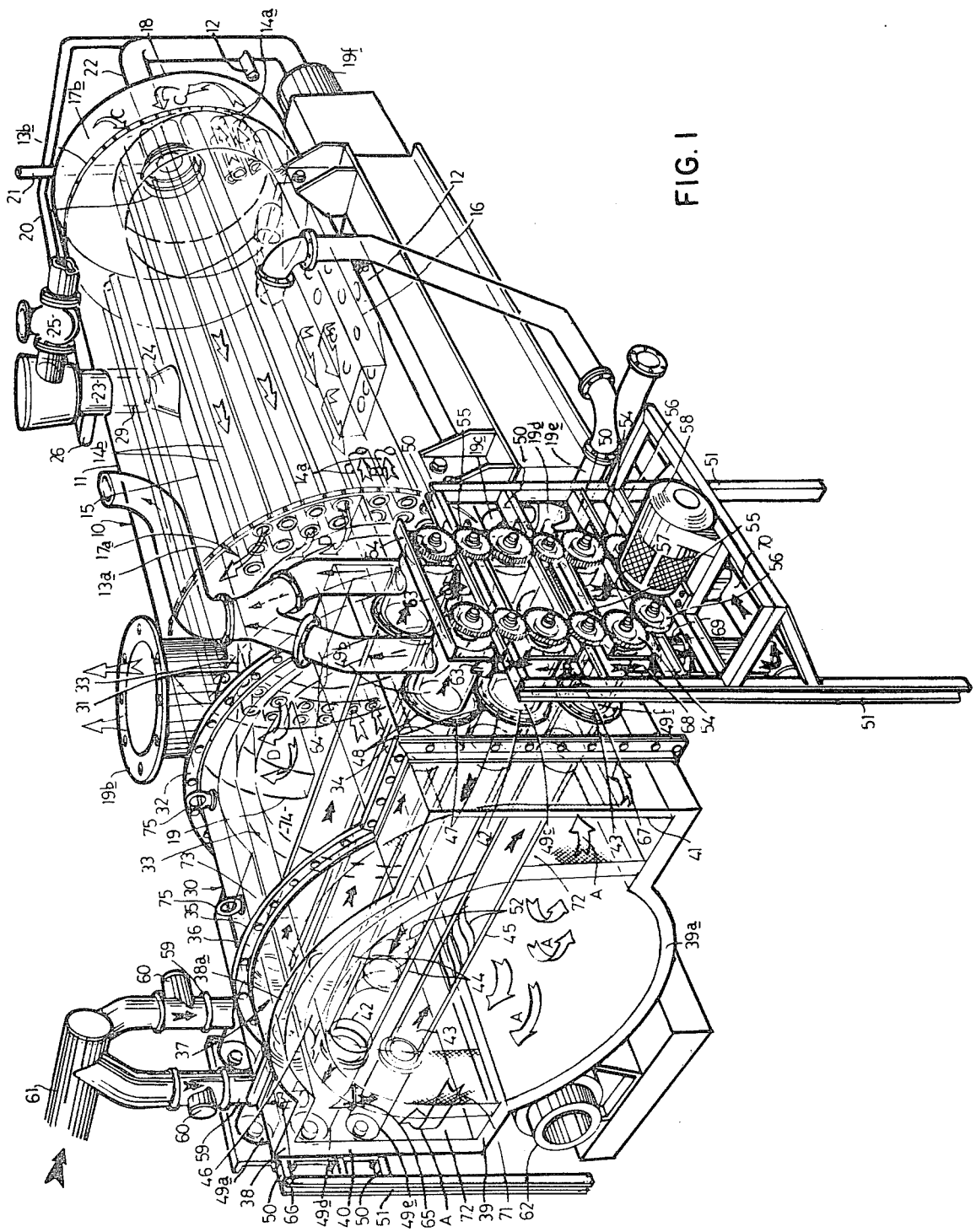
FIG. 1 is a perspective view of one embodiment showing in ghosted outline internal details of a basically conventional shell boiler and modified to embody the present invention.

Referring to FIG. 1 a basically conventional shell boiler but modified to embody the invention is shown generally at 10. The boiler 10 comprises an enveloping shell 11 within which are positioned tube plates 13a, 13b between which extend two of series or passes of smoke tubes 14a and 14b. Also positioned between the tube plates 13a and 13b is a generally cylindrical combustion chamber 15 within which is a refractory covered furnace grate 16 to the underside of which is fed primary air through a duct 12.

In a conventional boiler, before modification to embody the present invention, there is provided, between the rear end wall of the shell and the adjacent tube plate 13a a first smoke box (in FIG. 1 the region conventionally occupied by the first smoke box is indicated at 17a). Conventionally, the products of combustion from the combustion chamber 15 pass into the first smoke box and then pass through the first pass of smoke tubes 14a arranged parallel to the axis of the combustion chamber to a second smoke box 17b provided between the front end 18 of the shell and the adjacent tube plate 13b.

The products of combustion then pass through the further pass of smoke tubes 14b to an outlet chamber 19 at the rear of the boiler which contains a grit arrestor, not shown, for seperating grit from the combustion products which then pass through a flue and hence into a chimney 19b.

Grit from the grit arrestor passes through a conduit 19c into a venturi neck 19d provided in a further conduit 19e which extends from a blower 19f to the combustion chamber 15 at a postion adjacent the front end thereof so that a venturi action provides suction to draw grit from the arrestor into the conduits 19c and e and so that the grit is introduced into the combustion chamber 15 at a position adjacent the front of the furnace grate 16.

The boiler under discussion is a multi-fuel boiler and accordingly the combustion chamber is provided at its front end with a fluid fuel burner 20, e.g. an oil or gas burner to which fluid fuel is fed through conduit 21 by a suitable feed system.

A burner air supply duct 22 extends from the blower 19f and is arranged to feed burner air into the combustion chamber along a horizontal axis coincident with the axis of the fluid fuel burner 20. The hereinbefore mentioned primary air duct 12 branches from the burner air supply duct 22.

The furnace is also provided with a conduit 23 which extends vertically downwardly through the shell 11 and water space of the boiler and passes through the roof of the combustion chamber 15. This conduit is provided with means 24 to introduce solid fuel onto the furnace grate 16 in the combustion chamber 15. The solid fuel may be contained within a storage hopper and a suitable pneumatic feed means arranged to feed the solid fuel from the storage hopper to the top of the conduit via the fuel tube 25.

In addition, secondary combustion air may be supplied through a branch 26 of the primary air supply duct so as to be fed into the combustion chamber through passageways associated with the abovementioned vertical conduit.

As so far described the boiler is a conventional multi-fuel boiler.

In accordance with the present embodiment a pyrolytic retort assembly 30 is located at the rear end of the boiler beyond the region 17a conventionally occupied by the first smoke box so that the products of combustion which leave the combustion chamber 15 pass through the pyrolytic retort assembly 30, in heat transfer relationship thereto, prior to their entry into the first pass of smoke tubes 14a.

At the rear end of the furnace instead of the conventional end wall a flange 31 is provided to which is bolted a flange 32 of the pyrolytic retort assembly 30. Within the region 17a is provided a dividing wall 33 of refractory material and of an arch shape in transverse cross-section. Within the wall 33 is defined, in co-operation with the floor 34 of the region, a passage for the products of combustion from the combustion chamber to the retort assembly 30.

The retort assembly 30 is formed as a removable assembly provided with outwardly extending end flanges 32 and 35. As explained hereinbefore the flange 32 is arranged to be bolted to the flange 30 whilst the flange 35 is arranged to be bolted to a flange 36 provided on an end section 37 to be described in more detail hereinafter.

The pyrolytic retort assembly has upper and lower walls 38, 39 respectively of basically rectangular configuration but each having a central longtidinally extending, part-cylindrical, portion 38a, 39a respectively. The retort assembly also has generally rectangular side walls 40, 41 each provided with four larger diameter apertures 42 and two smaller diameter apertures 43 in which are mounted pyrolytic retort tubes 44, 45 respectively.

Also provided within the retort assembly is a further refractory dividing wall 46 which is arch-shaped in transverse cross section. The wall 46 is arranged to be contiguous with the wall 33 in the region of connection between the flanges 31 and 32.

The retort tubes 44, 45 are made of stainless steel or other suitable material able to withstand the high temperature gases produced within the retort without unacceptable corrosion. It is preferred that the material of the retort tubes has a high thermal conductivity in order to achieve efficient heat transfer. Although in this example four larger diameter and two smaller diameter cylindrical tubes have been described, if desired, the pyrolytic retort assembly may be provided with retort tubes of any desired number and configuration.

Each retort tube 44, 45 is provided with an outwardly extending flange 47 which co-operates with an outwardly extending flange 48 provided on stainless steel end sections 49a-f which are bolted to their associated side wall 40, 41 and further supported at their outer ends on horizontal beams 50 connected to uprights 51.

Rotatably mounted within each tube 44 is an Archimedes screw 52 each carrying a pinion 54. An idler gear 55 is provided between each pair of vertically adjacent gears 54 whilst the lowermost pair of drive pinions 54 are engaged with further idlers 56 which engage a drive gear 57 rotated by an electric motor 58. If desired any other suitable conveying means may be provided.

The end sections 49a of the upper pair of larger diameter retort tubes 44 are provided with an inlet 59 to which waste material to be pyrolised is fed via control valves 60 from a supply conduit 61, if desired more than one supply conduit may be provided and the waste material may be fed through the or each conduit by any desired means.

The material to be fed to the pyrolytic retort assembly 13 may comprise any desired suitable waste material for example, domestic waste, sewage sludge, or appropriate industrial waste. Depending upon the nature of the waste material it is pre-treated before entry into the conduit 61, for example, by drying and/or hogging to reduce the size of the waste material into a size suitable for feeding through the pyrolytic retort assembly.

The drying apparatus, hogging or other material treatment apparatus as well as the electric motor 58 may be driven by electricity produced by a turbine generator driven by steam produced in the boiler and preferably the generator is mounted on the boiler assembly as indicated at 62.

After entry of the waste material into the first pair of retort tubes 44 through the end sections 49a material is transferred along the retort tubes by the Archimedes screws 52 until it enters the end sections 49b where remaining solid waste material falls downwardly under gravity through ducts 63 whilst any gas formed in the conduit is permitted to exit through gas outlets 64.

The solid waste material falling under gravity through the ducts 63 enters end sections 49c and is transferred by a further Archimedes screw, of opposite hand to Archimedes screws of the upper (and lower) pairs of retort tubes, along the tubes 44 until it enters the end sections 49d where solid material can again fall under gravity via ducts 65 to the end sections 49e of the lowermost pair of tubes whilst again gas can exit through further gas outlets 66, which communicate with the outlet 64.

The solid material entering the end sections 49e is transferred by further Archimedes screws 52 along the smaller diameter tubes 45 where it enters the final end sections 49f where gaseous products again exit through gas outlets 67 which communicate with the outlets 64, whilst the charred residue falls through a duct 68 and passes via a valve 69 to a conduit 70 which feeds the solid material either to store, for subsequent use as solid fuel for feeding to the furnace grate 16, or for subsequent sale, or can feed the solid material directly to the conduit 23 for feeding to the furnace grate 16.

Gases and fine particles produced on pyrolysis after leaving through the gas outlets 64, 66 and 67 are fed into a suitable recovery system which may comprise, for example, a tar trap, ammonia scrubber, carbon dioxide and hydrogen sulphide scrubbers, light and heavy oil condensors and a methane or other combustible gas collection and/or storage arrangement. The methane, or other combustible gas, may be fed directly to the (gaseous) fluid fuel burner 20 of the boiler to fire the boiler or may be stored for subsequent sale or for use as a fuel for the boiler.

The oils generally contain valuable aromatics and hence it is commercially desirable to recover the oils for sale. However, if desired, they may also be used to fire the boiler or may be sold, as may other materials recovered.

The various fuels produced in the pyrolytic retort assembly can be combusted in the combustion chamber 15 at a temeperature approximately to 2,000° F. The surfaces to which the products of combustion are exposed before they enter into heat transfer relationship with the pyrolytic retort are arranged so as to reduce the temperature of the products of combustion to the desired temperature for pyrolysis. For example, a temperature approximately in the range 900°–2000° F.

High temperatures in this range produce more gas and less oil and charred products whilst lower temperatures produce more oil and charred products and less gas whilst even lower temperatures produce more charred products and less oil and gas.

Auxiliary fuel supply means are provided to permit of starting up operation of the boiler.

After the products of combustion have passed over the pyrolytic retorts 44, 45 they enter the end section 37 which is provided with a refractory perforated dividing wall 71 of arch shaped configuration so as to match with the arch shaped dividing wall 46 in the region of connection between the flanges 35 and 36. The dividing wall 71 is preferably of honeycomb construction and the products of combustion pass thorugh the appertures thereof and enter the region 72 outside the wall 71. The arrows A in the Figures illustrate the path taken by the gases. The gases then enter the region 73 between the dividing wall 46 of the pyrolytic retort assembly 30 and the outer walls thereof and then enter the region 17a in the space 74 between the dividing wall 33 and the shell 11. The gases then enter the first pass of smoke tubes 14a, as shown by arrow B, and pass therealong into the second smoke box 17b, enter the second pass of smoke tubes 14b, as shown by arrows C, and then enter the outlet chamber 19 and thus pass into the chimney 19b as shown by arrows D.

It should be appreciated, that if desired, less than, or more than, two passes of smoke tubes may be provided.

It is preferred that the pyrolytic retort assembly 30 is mounted so as to be removable from the boiler. The retort assembly 30 may be removable by providing attachment points 75 to permit a crane or other lifting apparatus to be engaged with the retort to lift the retort vertically upwardly.

Alternatively, the retort may be mounted on a transport means, for example a frame, supported on a suitable guideway to permit movement of the support means transversely horizontally of the boiler. The support means can carry two pyrolytic retorts simultaneously, one pyrolytic retort being located in operative position within the boiler and the other retort being located outwardly of the boiler at a position where the pyrolytic retort can be removed from and replaced in the support means.

By this arrangement when it is desired to change a pyrolytic retort it is merely necessary to move the support means transversely relative to the boiler whereby the pyrolytic retort previously in use is transferred to one side of the boiler where it can be removed from the support frame for maintenance and returned to the support frame or, alternatively, replaced by a different pyrolytic retort. Simultaneously with this removal of the previously used retort a new retort is moved into operative position within the boiler.

When it is desired to remove this further retort the support means is moved in the reverse direction so that there is simultaneous removal of one retort and introduction of a further retort.

It will be appreciated that with such an arrangement the time required for changing the pyrolytic retort is minimised.

The particular arrangement of pyrolytic retort may be changed, by the hereinbefore described mechanism, so that the most suitable form of pyrolytic retort for the particular waste material to be utilised can be conventiently introduced into the boiler.

Instead of the arrangement described hereinbefore, the pyrolytic retort assembly may be located within the first smoke box of an otherwise conventional shell boiler described hereinbefore so that the products of combustion pass from the combustion chamber directly into the smoke box and hence into heat transfer relationship with the pyrolytic retort and then enter the first pass of smoke tubes and continue their passage through the boiler as described hereinbefore.

Further alternatively the pyrolytic retort assembly may be constructed so that the tubular pyrolytic retorts are arranged to extend axially of the direction of gas flow and the retort assembly may be positioned axially in line with the combustion chamber or may be disposed to one side of the boiler with the axes of the tubes extending at right angles to the axis of the combustion chamber there being means to turn the products of combustion through 90° and, of course, to return the products of combustion back into the first pass of smoke tubes.

Additionally, there will now be described a method of gasification utilizing at least one set of three pyrolytic retorts in substantially the same configuration as one of the two sets of three pyrolytic retort 44 and 45 shown in FIG. 1. The three retorts are arranged in series flow to provide a continuous path for the gasification process.

Sanitary sewage sludge in slurry form is introduced into the initial retort. Products of combustion are passed over the retorts and saturated steam is evolued in the initial retort. The remaining sludge products which are generally residual solids are introduced into the intermediate retort where pyrolysis takes place.

A portion of the steam evolved from the initial retort is then passed to the final retort. The steam from the initial retort may be superheated by passing it through a superheated coul passing through the boiler and then directing it to the final retort in measured amounts. Material flowing from the intermediate retort passes to the final retort and is acted upon by the superheated steam taken from the initial retort. The superheated steam is then combined with the residual char in the final retort providing gasification. In this manner, carbon monoxide and hydrogen combinations are produced.

Figure 3:
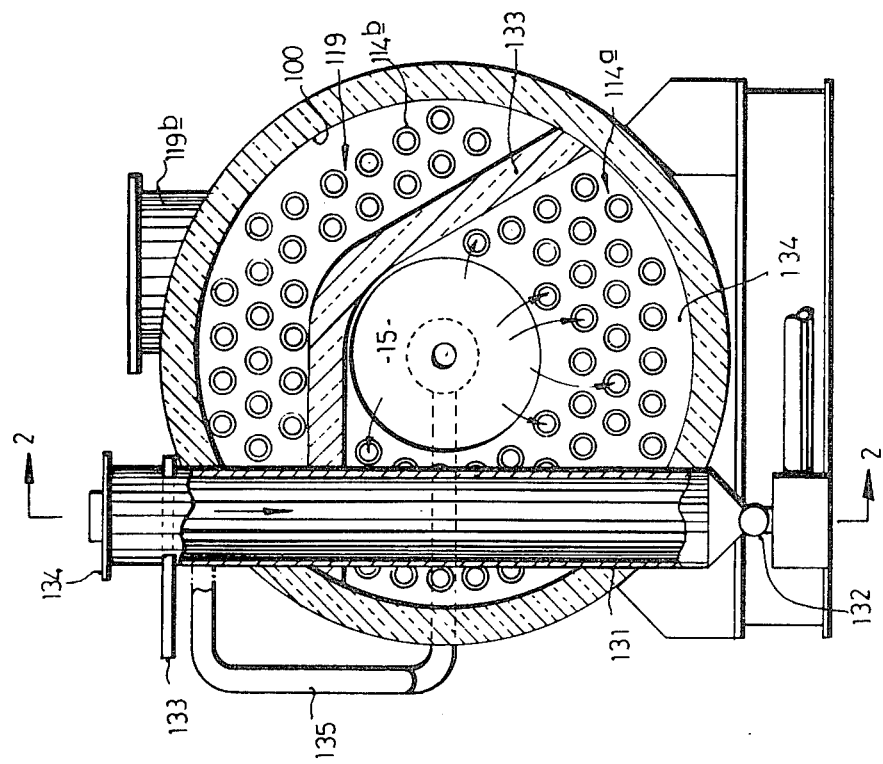
FIG. 3 is a section on the line 3—3 of FIG. 2.
Figure 2:
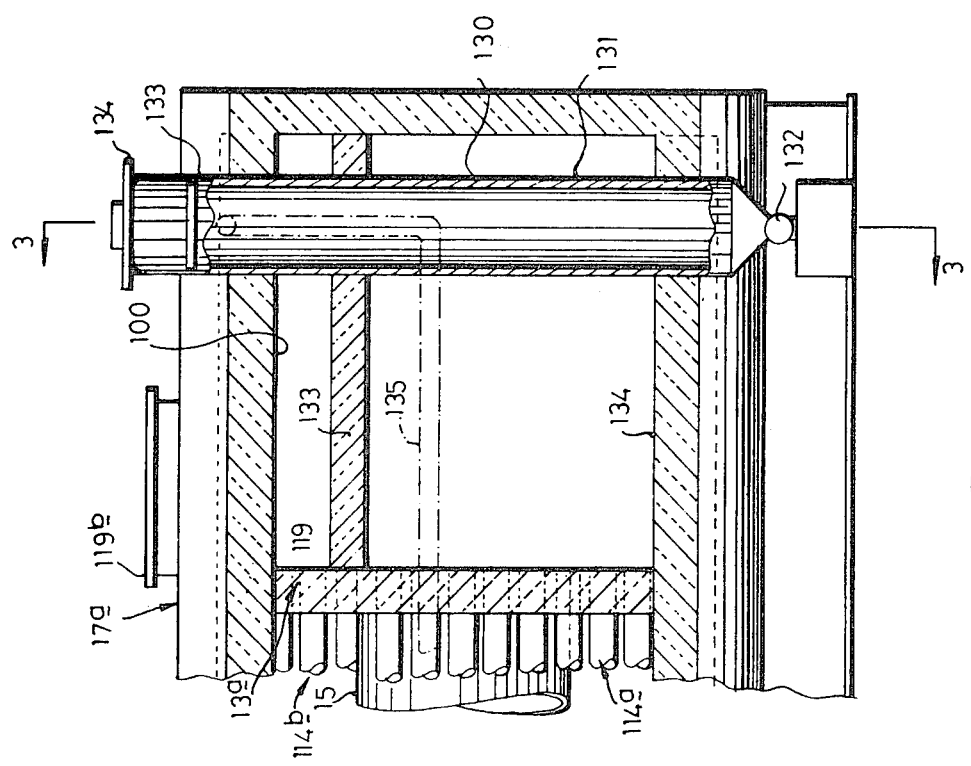
FIG. 2 is a fragmentary side elevation partly in section on the line 2—2 of FIG. 3 showing part of another embodiment of the invention.

Still further alternatively, referring to FIGS. 2 and 3, instead of a continuously fed pyrolitic retort assembly the boiler may be provided with a batch fed retort assembly.

In this embodiment of the invention the boiler is as described hereinbefore with reference to FIG. 1 except for the following differences. Within the region 17a there is provided a dividing wall 133 of refractory material of the shape best shown in FIG. 3. Within the wall 133 is defined in co-operation with the floor 134 of the region, a passage for the products for combustion from the combustion chamber to a pyrolytic retort assembly 130 and from the retort assembly 130 to a first set of smoke tubes 114a. Outside the wall 133 is defined, in co-operation with the outer wall 100 of the region 17a, an outlet chamber 119 which contains a grit arrestor as described in connection with the first embodiment and is connected through a flue to a chimney 119b.

It will be appreciated that in this embodiment of the invention the arrangement of the smoke tubes of the first and second passes is different to that of the first embodiment but in all other respects the boiler, forward of tube plate 13a, is as described in connection with the first embodiment.

The retort assembly 130 of the present embodiment is again formed as a removable assembly as described in connection with the first embodiment but instead of 6 horizontally arranged retort tubes to which waste material is fed continuously and through which it is continuously transferred by Archimedes screws there is provided in the present embodiment a single, vertical, pyrolytic retort tube 131 provided with a valve assembly 132 at its lower end to permit withdrawal of solid products of pyrolysis. At its upper end the tube 131 is provided with an "air lock" arrangement comprising a sliding valve element 133 and a pivoted door 134 whereby, in use, the waste material can be inserted into the air lock by closing the valve member 133 and opening the door 134 followed by closing of the door 134 and opening of the valve element 133 thus permitting the waste material to fall under the influence of gravity into the tube 131. A conduit 135 is provided to feed gaseous products of pyrolysis from the tube 131 either direct to a gas burner of the boiler or to a recovery system as described hereinbefore. Again as described hereinbefore the gaseous and solid products of pyrolysis can be fed to the boiler to provide fuel or to a suitable recovery system.

A paddle, not shown, may be provided within the tube 131 to ensure stirring of the waste material therein. If desired more than one tube 131 may be provided and the or each tube 131 may be arranged in other orientations, for example, they may extend horizontally transversely of the boiler or be inclined to the horizontal. If the or each tube is horizontal or inclined at an angle such that gravity does not cause the products of pyrolysis to fall to the lower end of the tube a suitable manually or mechanically operable feed device may be provided. Such a feeding device may comprise a rod one end of which extends externally of the tube through a sealing gland and the other end of which is provided with a transversely extending pusher plate whereby the rod can be manipulated to push waste material through the tube. It is preferred that the door and valve member 133 are provided with an interlock such that the door 134 cannot be opened unless the valve element 133 is closed and vice versa.

When pyrolysis of a batch of material is completed, which can be determined, for example by providing a pressure sensing means to sense the pressure in the pyrolytic retort, or conduit 135, a valve in the conduit 135 may be closed, automatically if desired. The solid products of pyrolysis can then be withdrawn by the valve 132.

Where gaseous pyrolysis products are fed directly to the gas burner of the boiler then immediately after waste material has been inserted into the tube, particularly if waste material is wet, the first gas passing through the conduit 135 and entering the boiler through the burner is steam which the boiler can accommodate. As pyrolysis commences and continues progressively drier and richer gas is obtained.

The boiler is provided with auxiliary firing means which is normally operable but which is connected to a steam pressure sensitive, temperature sensitive or other suitable sensing means, whereby when pyrolysis is producing combustible gas the fuel supplied by the auxiliary firing means can be automatically reduced so as to ensure that the boiler has a continuous firing rate at all times. It will be appreciated that at certain times the boiler may be fired solely by the auxiliary firing means, at other times solely by products of pyrolysis and at still further times by a combustion of the two.

In this example it will be seen that the products of combustion are not constrained to pass over the retort tube 131 before returning to the first pass 114a of smoke tubes and, if desired, the configuration of the wall 133 may be modified so as to be similar to that of the wall 33 of the first embodiment, together with the configuration of smoke tubes described in connection with the first embodiment, to ensure that the products of combustion are constrained to pass through the retort assembly before entering the first pass of smoke tubes.

In both embodiments, by locating the pyrolytic retort assembly beyond the normal rear end of the boiler shell it is possible to relatively easily and ecconomically convert an exisiting boiler to a boiler embodying the present invention. In addition very little extra width is required to accommodate a boiler embodying the present invention than is required to accommodate a conventional boiler. As it is generally found in practice that the space available in a horizontal transverse direction i.e., across the width of the boiler, is restricted whereas the space available in the lenghtwise direction of the boiler is not so often restricted this is an important practical consideration.

However, if for any reason the space available in the lengthwise direction of the boiler is limited the pyrolytic retort assembly can be disposed to one side of the boiler and appropriate diverting means provided to cause the products of combustion to pass through the pyrolytic retort and to be returned to the boiler to pass through the smoke tube.

If desired the products of combustion may pass through one or more passes of smoke tubes before passing through the pyrolytic retort assembly.

The boiler embodying the present invention is advantageous in that waste materials are destroyed without pollution of the atmosphere, the products of their destruction are used to fire a boiler as well as to cause pyrolysis and destruction of further waste material. The steam produced by the boiler can be utilised to drive appropriate parts of the boiler plant as well as being used for its normal applications. The plant may be driven either directly by steam where appropriate or by electric motors, the electric current for which is produced by a generator driven by steam. The products which are not used as a fuel for the boiler may be sold.

The arrangements described in at least some of our co-pending applications Nos. 38694/75 to 38697/75 and 38699/75 and 38700/75 may be incorporated in a boiler embodying the present invention.

We claim:

1. An industrial boiler comprising an outer continuous shell within which is contained a steam and/or water space of the boiler, a combustion chamber including a furnace having a furnace grate, a plurality of smoke tubes for passage therethrough of gaseous products of combustion of fuel burned in the furnace, means for feeding solid fuel to the furnace grate downwardly through the steam and/or water space of the boiler, a burner for feeding fluid fuel to the furnace, a pyrolytic retort, means for feeding said products of combustion into heat transfer relationship with said retort to pyrolise material in the retort, means for feeding said products of combustion after said heat transfer to said smoke tubes, and means for feeding products of pyrolysis from said retort to said solid fuel feed means and/or said fluid fuel burner.

2. A boiler according to claim 1 including means for removing the pyrolytic retort or a part thereof from the boiler.

3. A boiler according to claim 2 including means for lifting said pyrolytic retort vertically from the boiler.

4. A boiler according to claim 3 including a tranfer mechanism for moving said pyrolytic retort vertically, or horizontally transversely, of the boiler whereby one pyrolytic retort or part may be removed from the boiler and a second pyrolytic retort or part simultaneously introduced into the boiler.

5. A boiler according to claim 1 including means for feeding the output from the pyrolytic retort to a recovery system wherein the products are separated to permit recovery of desired components thereof.

6. A boiler according to claim 1 comprising at least one pyrolytic retort tube the longitudinal axis of which extends transversely of the furnace.

7. A boiler according to claim 6 wherein a plurality of pyrolytic retort tubes are provided the axes of which lie in a horizontal plane.

8. A boiler according to claim 6 wherein a single pyrolytic retort tube is provided the axis of which lies in a vertical plane.

* * * * *